United States Patent [19]

Slusarczuk et al.

[11] 4,201,831
[45] May 6, 1980

[54] MAGNETIC ADSORBENT COMPOSITE

[75] Inventors: George M. J. Slusarczuk, Schenectady; Ronald E. Brooks, Guilderland, both of N.Y.

[73] Assignee: General Electric Company, Schenectady, N.Y.

[21] Appl. No.: 726,960

[22] Filed: Sep. 27, 1976

[51] Int. Cl.² .............................................. B22F 1/02
[52] U.S. Cl. ........................................ 428/403; 55/74; 210/36; 210/40; 210/502; 252/447; 427/127; 427/216; 428/408; 428/900
[58] Field of Search .................. 210/36, 39, 40, 42 S, 210/502, 503; 252/62.53, 62.54, 421, 422, 428, 445, 447, 466 J; 423/445, 449; 55/74; 427/127, 216; 428/403, 408, 900

[56] References Cited

U.S. PATENT DOCUMENTS

| | | | |
|---|---|---|---|
| 2,761,880 | 9/1956 | Gerber et al. | 252/447 |
| 3,909,449 | 9/1975 | Nagai et al. | 252/447 |
| 3,923,651 | 12/1975 | Weiss et al. | 210/42 S |
| 3,960,770 | 6/1976 | Raley et al. | 252/422 |

*Primary Examiner*—Ivars C. Cintins
*Attorney, Agent, or Firm*—Jane M. Binkowski; James C. Davis, Jr.; Leo I. MaLossi

[57] ABSTRACT

Magnetic adsorbent composite composed of a magnetic substrate particle which is non-reactive under conditions of use and which is encapsulated with adherent activated carbon.

6 Claims, 1 Drawing Figure

MAGNETIC ADSORBENT COMPOSITE

The present invention relates to a tailorable magnetic adsorbent composite. In one particular aspect, the present adsorbent reduces the normal settling time of carbon powders several fold.

In many water and waste water purification and polishing processes, adsorbents are used to remove soluble impurities from solution. The most widely used adsorbent, because of cost, availability and effectiveness, is activated carbon.

Adsorption capacity of activated carbon depends mainly on three factors: affinity of the adsorbent for solute(s), variation of that affinity with concentration of the solute and total area available for adsorption. Adsorption capacity is generally expressed either as an adsorption index (usually given as "number"—weight of adsorbate/weight of adsorber) for a specific model substrate i.e. iodine, phenol, methylene blue, etc., or in the form of an "adsorption isotherm"—a log log plot of amount adsorbed per weight of carbon vs amount of solute remaining in solution. The larger the surface area available for adsorption the more substrate that can be adsorbed. In the case of activated carbon, the total surface area is essentially independent of particle size as it is the internal surface area of the pores that provides the major portion of the available area. Crushing a larger carbon particle only insignificantly increases the total available surface area, but it exposes the internal pores to easy accessibility.

The most important factor influencing adsorption rate is particle size of the adsorbent. Although adsorption on an exposed surface is very rapid, (on the order of microseconds) the adsorption rate of a carbon particle is diffusion limited. Thus, a small particle having a large surface to volume ratio has much higher adsorption rate than a large particle. With <0.045 mm carbon powder 90% of adsorption is over in the first 15 seconds. With particles of 3–5 mm in diameter several hours contact time is necessary to reach 90% of capacity.

Activated carbon generally has a broad adsorption specificity i.e. it adsorbs well many classes of solutes.

Granular activated carbon, the form more widely used at the present time, has the advantage that it can be used in an adsorption bed or in a column for both upflow and downflow operation without particular problems, provided the flow rates are not excessive. Otherwise, it fluidizes in upflow operation or displays a large pressure drop in downflow operation. Its main disadvantage is the relatively slow adsorption rate necessitating contact times on the order of 30 minutes. Thus, a column has to be made large enough to provide the required contact time, and necessitates the use of large quantities of excess carbon.

Powdered carbon has the great advantage of rapid adsorption rate and cost over granular carbon, but it is difficult to handle and to separate from solution and provisions for settling and/or flocculation have to be made for satisfactory recovery. This cancels the primary advantage obtained from increased adsorption rate. Furthermore, the settled adsorbent is usually quite voluminous, making handling and disposal of it difficult and therefore expensive.

Granular carbon is regenerated most frequently thermally, less frequently hydrothermally, with superheated steam and oxygen. Powdered carbon is seldom regenerated since economical methods have not been worked out for it. Carbon and other adsorbents can also be regenerated by chemical extraction.

The present invention is directed to a magnetic adsorbent composite with a large external surface area, i.e. high adsorption rate, that is easy to handle, remove and regenerate. Specifically, since the present adsorbent composite is magnetic, it provides a "handle" for manipulation. For example, conventional techniques used for manipulating magnetic particles can be used with the present magnetic adsorbent to hold it in place against hydrodynamic or other force, to separate it from a solution by means of "magnetic filters" or to pump and transfer it magnetically.

For instance, activated powdered carbon, exhibits a very rapid adsorption rate, thus requiring short contact time for equilibrium saturation. But instead of flocculation or settling necessary to remove ordinary powdered carbon from solution, the present magnetic adsorbent composite can be separated by means of a magnetic field—a rapid process requiring no additives. The settled magnetic slurry can than be pumped magnetically for regeneration and reuse.

Those skilled in the art will gain a further and better understanding of the present invention from the figures accompanying and forming part of the specification in which.

Figure 1:
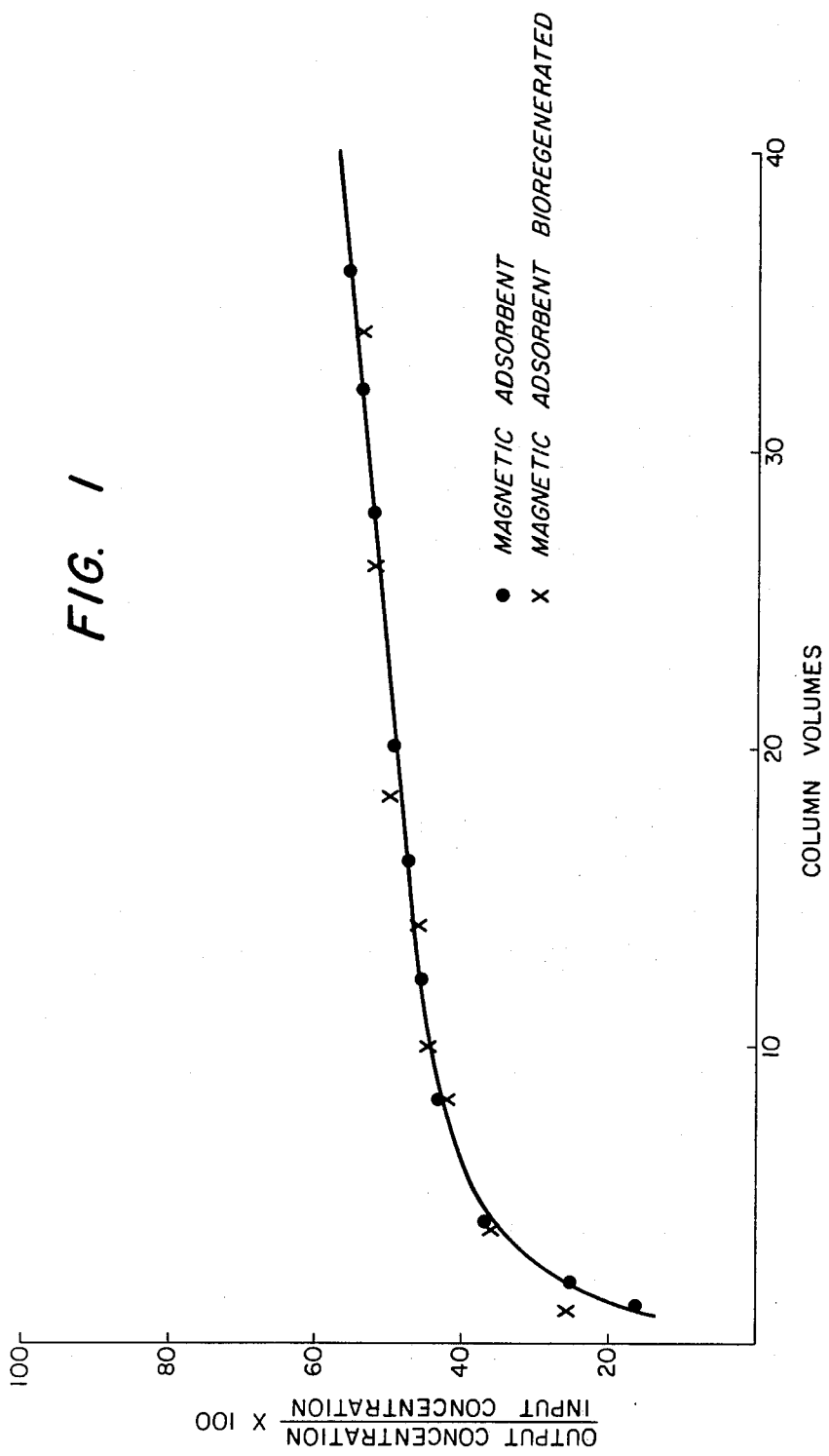
FIG. 1 illustrates the adsorption capacity of the present magnetic adsorbent and the adsorption capacity of the same magnetic adsorbent after it has been bioregenerated showing that it has suffered no loss in adsorption capacity.

The present adsorbent is a composite consisting essentially of a magnetic substrate or core particle encapsulated or substantially encapsulated with adherent activated carbon.

Briefly stated, the present process comprises providing a magnetic substrate particle having a minimum size of about 100 Angstroms in diameter, providing an organic material which is solid at room temperature and which at a temperature ranging from about 50° C. to about 1000° C. at atmospheric pressure decomposes to yield elemental carbon and gaseous product of decomposition, admixing a plurality of said substrate particles with said organic material to form a substantially thorough mixture, heating said mixture to decompose said organic material yielding elemental carbon and gaseous product of decomposition, and grinding the resulting carbon-substrate particle mass to produce the present magnetic adsorbent composite of predetermined size ranging from about one micron to about 10 millimeters in diameter.

The substrate particle or core portion of the present adsorbent composite is an insoluble and non-toxic material which is inert under aqueous and oxidizing conditions. Specifically, it is a material which is non-reactive under the conditions used to prepare the absorbent composite and nonreactive under the conditions of use as an adsorbent. The magnetic substrate particle has a size ranging from about 100 Angstroms in diameter to about 10 millimeters in diameter and generally for most applications, it ranges from submicron size to about 4 millimeters in diameter.

The term magnetic is used herein to indicate a material which is magnetized by a magnetic field. Representative of the magnetic materials which are useful as the substrate material in the present invention are nickel, iron, cobalt, metal alloys and ferrites, particularly magnetite.

The organic material is an organic compound or polymer which is a solid at room temperature and which decomposes at a temperature ranging from about 50° C. to about 1000° C. to yield elemental carbon and gaseous product of decomposition. Typical of such organic materials is coal tar, pitch, asphalt and various organic polymers and copolymers such as vinylidene chloride copolymers with vinyl chloride or acrylonitrile generally referred to as saran and polyamides generally referred to as nylon.

In carrying out the present process, the substrate particles are admixed with the organic material to form a substantially thorough mixture. The particular amount of organic material used is determined largely by the amount of elemental carbon it yields on decomposition, the amount or thickness of the encapsulating elemental carbon required and the amount and size of the substrate particles. The minimum amount of organic material used is that amount which would insure an amount of elemental carbon sufficient to form at least a continuous coating which encapsulates the substrate particles and such amount is determinable empirically. Generally, to insure an amount of carbon sufficient for such encapsulation, the organic material should be used in an amount significantly in excess of the substrate particles, i.e. from about a third to about two times the amount of substrate particles. There is no particular limit on the maximum amount of organic material used, but generally it is that amount sufficient to provide a substrate particle of minimum diameter of about 100 Angstroms or 0.00001 millimeter in diameter, with an encapsulating coating or layer of elemental carbon about 10 millimeters in thickness, the maximum diameter of the present adsorbent composite.

A number of techniques can be used to produce a substantially thorough or uniform mixture of the substrate particles and organic material. In one technique the organic material in powder form is admixed with the substrate particles by conventional means such as a mill to form a substantially thorough mixture. In another technique the organic material can be heated to melt it and in molten form it is admixed with the substrate particles by suitable means. Alternatively, the organic material can be dissolved in a solvent and the resulting solution admixed with the substrate particles to form a uniform mixture. In each instance, the resulting mixture is heated to the decomposition temperature of the organic material to yield elemental carbon and the gaseous product or products of decomposition are diffused away. The decomposition is preferably carried out in an oxygen-free atmosphere such as nitrogen or argon. The resulting carbon-substrate particle mass is ground to a predetermined size producing the present flowable adsorbent composite. Grinding of the mass can be carried out by a number of conventional techniques such as by means of dry ball milling. A fine sizing in an air stream will separate any low-density material, i.e., carbon without the high density core.

On decomposition of the organic material, elemental carbon is produced which adheres or bonds itself to the surface of the substrate particle and which usually is sufficiently activated to be useful as an adsorbent. The bond between the substrate surface and elemental carbon is sufficiently strong so that the composite can be handled for gas and liquid adsorption applications without significant loss of activated carbon. The extent to which the carbon is activated varies largely with the particular organic material being decomposed. In the present invention by a sufficiently activated carbon to be useful it is meant an activated carbon having a minimum surface area of about 200 square meters per gram as measured by means of a gas adsorption or an iodine number of at least about 50. Such large surface areas indicate a porous structure which provides the adsorption means. If desired the present adsorbent composite can be treated by a number of techniques to increase its activation, or if necessary to activate it. One such technique is to heat the adsorbent composite in steam at a temperature of about 800° C.

The adsorbent composite is composed of a magnetic substrate particle ranging in size from about 100 Angstroms or 0.00001 millimeter to about 10 millimeters in diameter which is encapsulated or substantially encapsulated with activated carbon in an amount or thickness ranging from about 10 millimeters to about 100 Angstroms. Although the maximum size of the magnetic substrate particle appears to overlap with the maximum size of the adsorbent composite this is not so since a substrate particle about 10 millimeters in a diameter encapsulated with a coating of elemental carbon about 100 Angstroms or 0.00001 millimeter in diameter would result in an adsorbent composite about 10.00001 millimeters in diameter which in the art is considered equivalent to a diameter of about 10 millimeters.

The size of the present magnetic adsorbent composite depends on its particular application. It can range from about one micron or 0.001 millimeter to about 10 millimeters in diameter, but generally for most applications, it ranges from about 5 microns to about 5 millimeters in diameter. The present adsorbent composite can be a single particle composed of substrate particle encapsulated or substantially encapsulated with activated carbon. When substrate particles ranging from about 100 Angstroms to about 4 millimeters in diameter are used, the composite is frequently a cluster composed of a plurality of substrate particles distributed in a matrix of activated carbon with the substrate particles within the matrix usually being totally encapsulated whereas those at the edge of the cluster usually being substantially encapsulated by the carbon matrix.

For a given size of adsorbent composite, adjustment of the substrate or core/carbon weight ratio will change its adsorption capacity. Specifically, an increase in the proportion of carbon increases the adsorption capacity of the adsorbent composite.

The present tailorable adsorbent composite is useful as an adsorbent for gaseous or liquid or dissolved contaminants in gaseous or liquid systems. Specifically, the present adsorbent composite with particularly high adsorption capacity is one with as fine a size as possible since the smaller the particle size the larger is the surface area available for adsorption.

One particular application of the present magnetic adsorbent composite is to use it to combine the processes of adsorption and filtration into one operation. Specifically, after a period of filtration-adsorption the magnetic adsorbent can be washed free from the filtered suspended solids by suspending it in water, magnetically concentrating the adsorbent composite particles freed from suspended solids and draining off the suspended solids with the water. The cleaned adsorbent can then be regenerated and reused.

Another application is to use the present magnetic adsorbent composite in a column configuration in an upflow mode. At some relatively high hydraulic flow the adsorbent will fluidize and be washed out of the column. But being magnetic, it can be held in place by magnetic force, permitting even higher hydraulic flow.

After the present composite is used, its adsorption properties can be regenerated by methods available for regeneration of regular powdered or granular activated carbon. In one such method the carbon sludge is dropped through a counter-current hot air and the adsorbed impurities are burned off.

Regeneration of the present magnetic adsorbent can also be carried out biologically, i.e. it can be bioregenerated. The term bioregeneration as used herein refers to digestion by bacteria of organic impurities on or adhering to the magnetic adsorbent and restoration of its adsorptive properties.

The invention is further illustrated by the following examples:

EXAMPLE 1

6.0 grams of a saran vinylidene chloride-vinyl chloride copolymer, i.e. "Saran 300", were dissolved in about 25 ml of methylethyl ketone. 2.0 grams of one micron diameter nickel powder were added to the resulting solution and mixed well. The mixture was left in a hood to evaporate the solvent and then placed in a drying oven at 110° C. overnight. The resulting dried mixture was kneaded to uniformly disperse the nickel metal particles in the soft polymer and then it was carbonized in a tube furnace wherein all heating was carried out at atmospheric pressure in a stream of nitrogen flowing at one cubic foot per minute observing the following regimen: the mixture was heated overnight at 250° C., then the temperature was raised to 700° C. over a period of 4 hours and carbonized at 700° C. for 8 hours and then cooled in the stream of nitrogen. The resulting brittle carbonaceous mass was crushed in a mortar to a size of about 0.045 millimeter in diameter.

The resulting composite was composed of clusters and was flowable. Each cluster had a plurality of the nickel particles distributed in a matrix of elemental carbon. Only the nickel particles at the edge of the cluster were not totally encapsulated with carbon but were considered to be substantially encapsulated whereas all of the remaining nickel particles within the matrix were totally encapsulated with elemental carbon.

EXAMPLE 2

8 grams of steep asphalt, a tar which is a solid at room temperature and which is decomposable at atmospheric pressure at 700° C. to yield elemental carbon and gaseous products of decomposition, were dissolved in about 50 ml of benzene. 2.0 grams of nickel powder, 1 micron in diameter, were added to the resulting solution and mixed well. The mixture was heated on a hotplate to evaporate the benzene and the resulting residue was kneaded well to disperse the nickel particles uniformly throughout the tar. The resulting mixture was carbonized in a tube furnace wherein all heating was carried out at atmospheric pressure in a stream of nitrogen flowing at one cubic foot per minute observing the following regimen: the mixture was heated overnight at 250° C., then the temperature was raised to 400° C. and held there for 4 hours and then raised to 700° C. It was held at 700° C. for 8 hours and cooled in the stream of nitrogen. The carbonaceous mass was ground in a mortar to a size of about 0.045 millimeters in diameter.

The resulting composite was composed of clusters and was flowable. Each cluster had a plurality of the nickel particles distributed in a matrix of elemental carbon. Only the nickel particles at the edge of the cluster were not totally encapsulated with carbon but were considered to be substantially encapsulated whereas all of the remaining nickel particles within the matrix were totally encapsulated with elemental carbon.

EXAMPLE 3

Iodine Number and Adsorption Isotherm (FIG. 2) was determined according to the procedure of Culp and Culp disclosed in Advanced Waste Water Treatment, Van Nostrand Reinhold Co., pp. 249-255. The following Iodine Number values were obtained:
Magnetic adsorbent composite prepared in Example 1—1190
Magnetic adsorbent composite prepared in Example 2—1100

EXAMPLE 4

The magnetic adsorbent composite prepared in Example 1 was ground in a mortar to pass a 325 mesh screen, i.e. it had a particle size less than about 0.044 millimeter. 250 milligrams of this adsorbent were weighed out into a 500 ml centrifuge bottle and loaded by shaking it with 250 ml of centrifuged septic effluent for 10 minutes. It was left to settle for another 10 minutes and the supernatant decanted. A small magnet was held below the stream during decantation, and it collected some fine sized magnetic adsorbent particles that would have been otherwise lost. The decanted supernatant was filtered and its TOD (Total Oxygen Demand) determined. The process was repeated three more times and was run in duplicate. On the average the magnetic adsorbent composite adsorbed about 200 milligrams TOD per 1g of adsorbent.

Figure 2:
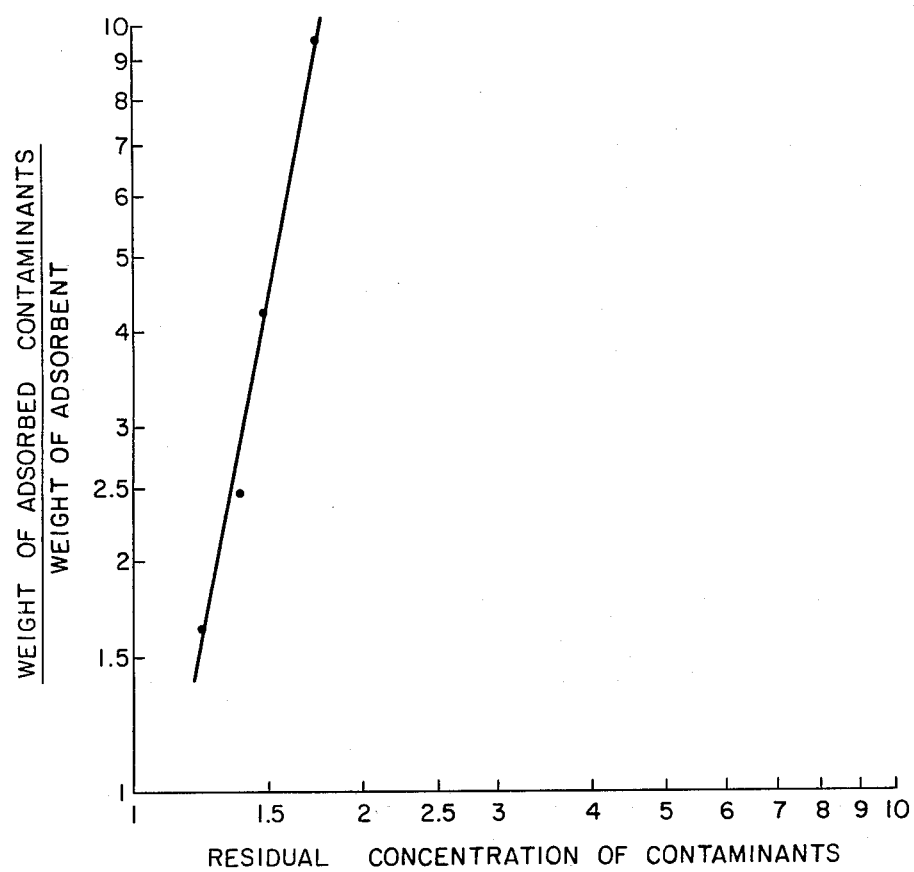
FIG. 2 illustrates the high adsorption capacity of the present magnetic adsorbent by means of an adsorption isotherm.

The results are shown in FIG. 2 where the steepness of the slope of the adsorption isotherm shows the high adsorption capacity of the magnetic adsorbent. The adsorption isotherm was determined according to the procedure of Culp and Culp disclosed in Advanced Waste Water Treatment, Van Nostrand Reinhold Co., 1971, pp. 249-255. After completion of adsorption, as described above, the magnetic adsorbent composite was bioregenerated. Bioregeneration was accomplished overnight by shaking the magnetic adsorbent with 100 ml of PAS at ½ concentration. PAS is an inorganic solution containing phosphorus, ammonia and salts commonly used in bacteriology. The magnetic adsorbent was initially inoculated with a mixed bacterial strain that has lived on powdered nonmagnetic carbon for some weeks. On subsequent regenerations no inoculation was used. After 4 regeneration cycles no diminution of adsorption capacity of the magnetic adsorbent was noted, nor was the activated carbon matrix visibly abraded.

EXAMPLE 5

A small column (7×300 mm) was packed with 35-60 mesh magnetic adsorbent prepared in Example 1, i.e. it ranged in size from about 0.25 millimeter to about 0.5 millimeters. It was loaded with municipal primary effluent until the effluent contained about 50% of the influent TOD, then it was bioregenerated in situ overnight. A small permanent magnet at the upper end of the column held the magnetic adsorbent particles in place at flow velocities where, without the magnet, the particles were fluidized and washed out. The loading-bioregeneration cycle was repeated 4 times and it is illustrated in FIG. 1. Specifically, FIG. 1 shows the high adsorption capacity of the magnetic adsorbent where up to 40 column volumes were treated before 60% of the incoming impurities were not removed. FIG. 1 also shows that after regeneration by biological means in situ neither the activity or the adsorption capacity of this magnetic adsorbent suffered.

The following cited copending patent applications are, by reference, made part of the disclosure of the present application.

In copending U.S. patent application, Ser. No. 726,963 (RD-8985), entitled "High Density Carbon Adsorbent Composite" filed of even date herewith in the names of George M. J. Slusarczuk and Ronald E. Brooks and assigned to the assignee hereof, there is disclosed an adsorbent composite composed of a high density substrate particle which is non-reactive under conditions of use and which is encapsulated with adherent activated carbon.

In copending U.S. patent application, Ser. No. 726,962 (RD-8986), entitled "Magnetic Adsorbent And Flocculant" filed of even data herewith in the names of George M. J. Slusarczuk and Ronald E. Brooks and assigned to the assignee hereof, there is disclosed a method for simultaneous removal of soluble and insoluble impurities from polluted liquids by adding thereto a magnetic adsorbent composite powder which adsorbs soluble organic impurities and a flocculant which flocculates suspended solid impurities and the magnetic powder and magnetically settling the flocculated mixture.

In copending U.S. patent application, Ser. No. 726,961 (RD-8984), entitled "Ferrite Flocculating System" filed of even data herewith in the names of George M. J. Slusarczuk and Ronald E. Brooks and assigned to the assignee hereof, there is disclosed a method for removal of insoluble suspended impurities from polluted liquids by adding thereto a magnetic ferrite powder suspendible therein and a polyethyleneimine flocculant which flocculates suspended solid impurities and the magnetic powder producing a dense flocculated mixture.

What is claimed is:

1. A process for producing a magnetic adsorbent composite which comprises providing a magnetic substrate particle ranging in size from about 100 Angstroms to about 10 millimeters in diameter, providing an organic material which is a solid at room temperature and which at a temperature ranging from about 50° C. to about 1000° C. at atmospheric pressure decomposes to yield elemental carbon and gaseous product of decomposition, admixing a plurality of said substrate particles with said organic material to form a substantially uniform mixture, heating said mixture to decompose said organic material yielding elemental carbon and gaseous product of decomposition; and grinding the resulting carbon-substrate particle mass producing a magnetic adsorbent composite of predetermined size ranging from about one micron to about 10 millimeters in diameter, said magnetic adsorbent being comprised of said substrate particle at least substantially encapsulated with said carbon.

2. A process according to claim 1 wherein said magnetic substrate particle has a size ranging from about 100 Angstroms to about 4 millimeters.

3. A process according to claim 2 wherein said magnetic adsorbent composite range in size from about 5 microns to about 5 millimeters.

4. A process according to claim 1 wherein said organic material is steep asphalt.

5. A process according to claim 1 wherein said organic material is a vinylidine chloride-vinyl chloride copolymer.

6. A magnetic adsorbent composite ranging in diameter from about one micron to about 10 millimeters consisting essentially of a magnetic substrate particle ranging in diameter from about 100 Angstroms to about 4 millimeters, said substrate particle being at least substantially encapsulated with elemental active carbon in a thickness ranging from about 100 Angstroms to about 10 millimeters, with a plurality of said substrate particles in a matrix of said active carbon.

* * * * *